US006927514B2

(12) United States Patent
Nesic

(10) Patent No.: US 6,927,514 B2
(45) Date of Patent: Aug. 9, 2005

(54) INTEGRATED ACTUATOR

(75) Inventor: Zoran Nesic, Toronto (CA)

(73) Assignee: C-Mac Invotronics, Ontario (CA)

( * ) Notice: Subject to any disclaimer, the term of this patent is extended or adjusted under 35 U.S.C. 154(b) by 0 days.

(21) Appl. No.: 10/642,304

(22) Filed: Aug. 18, 2003

(65) Prior Publication Data

US 2005/0040715 A1 Feb. 24, 2005

(51) Int. Cl.[7] .................................................. H02K 5/00
(52) U.S. Cl. .............................. 310/89; 310/83; 310/71
(58) Field of Search ............................... 310/71, 89, 83

(56) References Cited

U.S. PATENT DOCUMENTS

| | | | | |
|---|---|---|---|---|
| 4,398,135 A | * | 8/1983 | Busch et al. ................. 318/443 |
| 5,063,317 A | * | 11/1991 | Bruhn .......................... 310/91 |
| 5,245,258 A | * | 9/1993 | Becker et al. ............... 318/266 |
| 5,382,857 A | * | 1/1995 | Schellhorn et al. ........... 310/83 |
| 5,446,326 A | * | 8/1995 | Scheider ....................... 310/83 |
| 5,453,649 A | * | 9/1995 | Blanchet ....................... 310/71 |
| 5,528,093 A | | 6/1996 | Adam et al. ................. 310/801 |
| 5,731,646 A | | 3/1998 | Heinze et al. ............... 310/801 |
| 5,923,094 A | * | 7/1999 | Seeberger et al. ........... 307/9.1 |
| 6,107,713 A | * | 8/2000 | Hulsmann et al. ........ 310/75 R |
| 6,191,512 B1 | * | 2/2001 | Lekeux et al. ................ 310/89 |
| 6,232,684 B1 | * | 5/2001 | Haag et al. ............... 310/68 R |
| 6,452,297 B2 | * | 9/2002 | Yamamoto et al. ........... 310/89 |
| 6,462,445 B1 | * | 10/2002 | Weber et al. .................. 310/91 |
| 6,528,915 B1 | * | 3/2003 | Moskob ....................... 310/71 |

\* cited by examiner

Primary Examiner—Dang Le
(74) Attorney, Agent, or Firm—Patton Boggs LLP

(57) ABSTRACT

An integrated, unitary actuator formed of a frame having structure for connecting an actuator motor, a structure for supporting a power translation member, and a structure for enclosing a control circuit. Optionally, a clearance structure of the frame receives a shaft of the actuator motor, and a passage from the control circuit enclosure to the clearance structure provides access for electrical power and sensor information between the control circuit to the actuator motor. Further optional, a cover plate over the structure for enclosing the control circuit secures the control circuit and provides a single-receptacle connection to the vehicle.

17 Claims, 5 Drawing Sheets

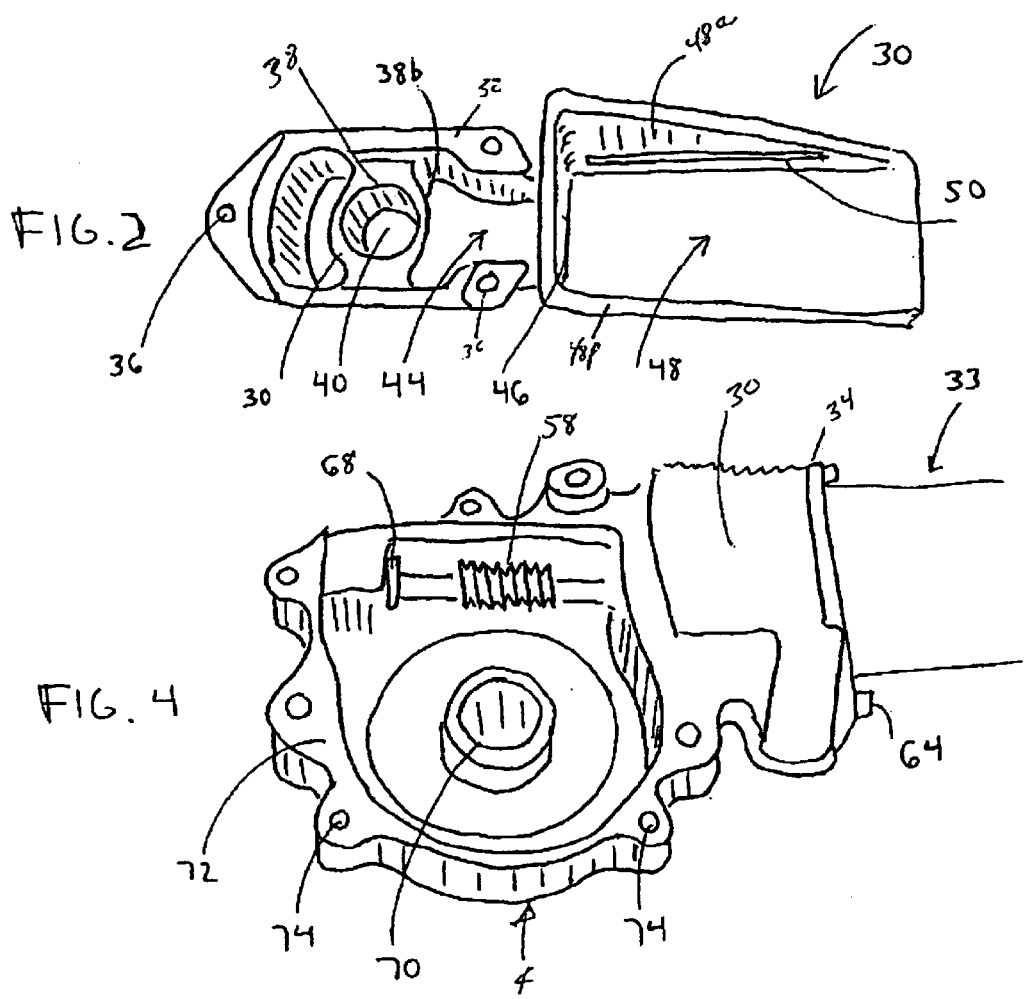
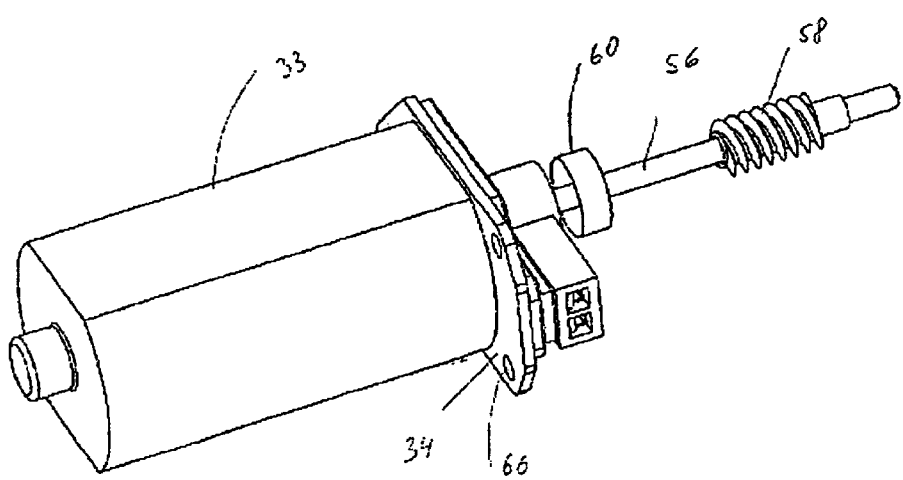
Figure 3

US 6,927,514 B2

INTEGRATED ACTUATOR

BACKGROUND OF THE INVENTION

1. Field of the Invention

The present invention relates to an actuator and, more particularly, to an integrated actuator apparatus particularly suited for power windows, power roofs and other actuator-operated structures of a motor vehicle.

2. The Related Art

Most vehicles currently sold, including automobiles, light trucks, and sport-utility vehicles (SUVs) are equipped with actuator-operated selectively movable structures such as, for example, power windows and power sunroofs. As is known in the art, the complete actuating subsystem for such structures as power windows and power sunroofs comprises numerous components, each mounted by one or more various brackets and supports within, for example, the vehicle doors, or within the vehicle roof between the headliner and outer body shell. The several components are connected to one another by wires and power translation mechanisms.

FIG. 1 shows a typical prior art actuator mechanism for a vehicle sunroof, having a multi-component arrangement that is exemplary of current design and construction methods. As can be seen, the FIG. 1 example includes an actuator motor 33, a gearbox 4 of the drive unit, a first control harness 6, connected at one end by a first external removable connection 8 to a limit switch (not visible) inside of the gearbox 4, and connected at its other end by a second removable external signal connection 10 to a separate control module casing 12. The assemble further comprises a second control harness 14 connected at one end by a third removable power connection 18 to external wires from the actuator and by a fourth removable motor connection 16 to the control module casing 12. The assembly further comprises a fifth removable main connection 20 for vehicle power and control line connection to the control module casing 12.

Because the typical vehicle structure actuator subsystem, such as the FIG. 1 power sunroof actuator, comprises a number of separate mechanical parts, there are associated immediate costs such as, for example, added raw materials due to many of the individual parts requiring their own housing, assembly time for mounting each of the individual parts to the vehicle and connecting them together, testing to ensure that the assembled collection of parts function as a unit, and the maintaining of a parts inventory.

SUMMARY OF THE INVENTION

The present apparatus is directed at the above-identified shortcomings, and further advances the art of vehicle power actuators with additional features and benefits.

An example embodiment includes a frame having structure for receiving and securing an actuator motor, a power translation member for transferring a power from the motor to an external driven member, and structure for supporting and enclosing a control circuit. An actuator motor is connected to the frame, and control circuitry disposed within the structure for supporting and enclosing same, forming an integrated, single-unit actuator. Preferably, a single receptacle arranged on, or integral with, a portion of the frame or a cover for the frame receives a vehicle power/control connector delivering, through the single receptacle, all necessary power and control to the actuator.

It is therefore an object of the invention to provide an actuator that eliminates the need to assemble a multi-component actuator within a vehicle.

It is another object of the invention to provide an actuator that has a reduced number of electrical connectors.

It is a further object of the invention to provide an actuator using a reduced number of mechanical parts as compared to the actuators of the existing art.

BRIEF DESCRIPTION OF THE DRAWINGS

These and other objects of the invention will be clear upon a reading of the following detailed description of several preferred embodiments of the invention, together with the following drawings of which:

FIG. 2 is a front view of an example hardware embodiment of an actuator housing according to an example aspect, showing an example motor support and receiving portion;

FIG. 3 shows an example hardware embodiment of an actuator driving motor with an integral worm gear and ring magnet, for integration with the FIG. 2 housing;

FIG. 4 is a top view of a driven gear housing portion of the FIG. 2 example actuator housing, with the FIG. 3 motor and integrated driving worm inserted into the FIG. 2 depicted motor support and receiving portion;

DETAILED DESCRIPTION OF THE INVENTION

Figure 1:
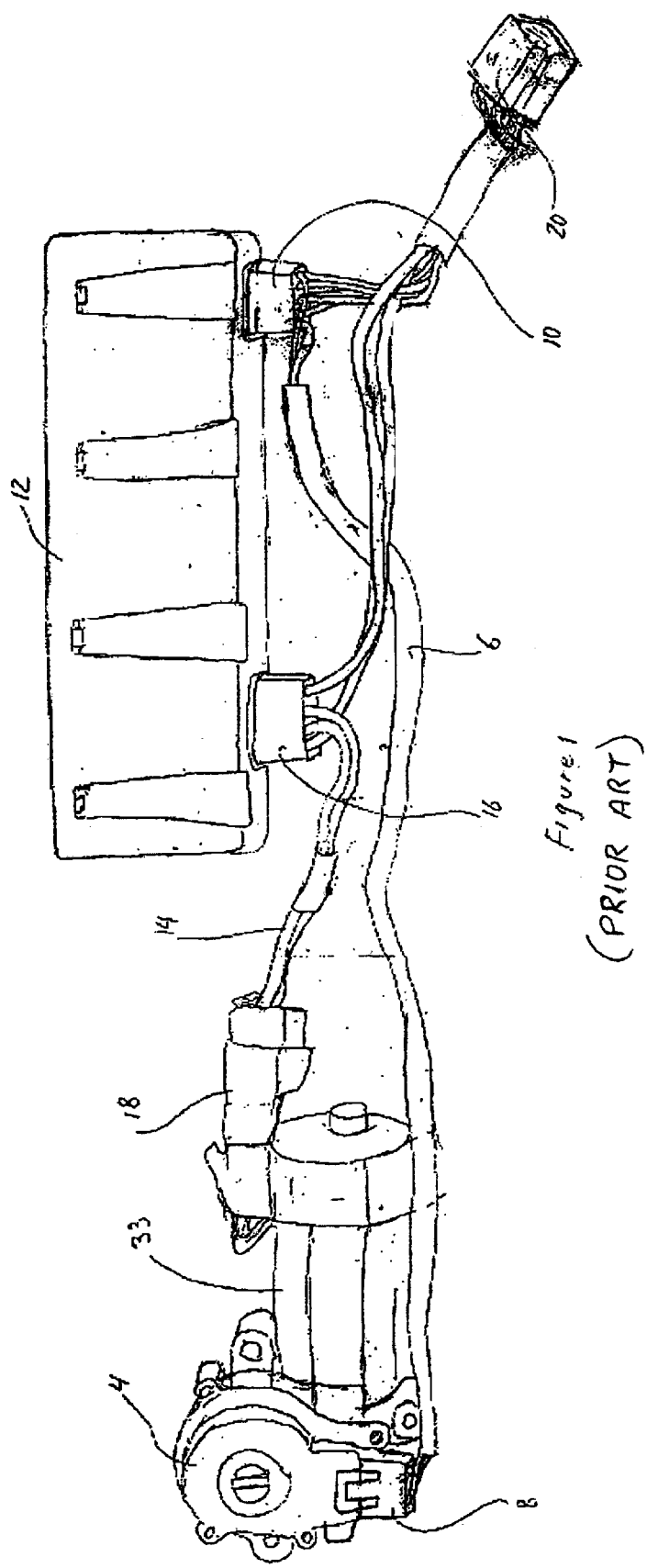
FIG. 1 shows an example prior art vehicle actuator assembly.

FIG. 2 shows a front view of an example integrated actuator frame or main housing 30. For brevity, item 30 is referenced as a "main housing," but, as will be understood from this description, the structure of item 30 functions both as a partial housing and as a main support frame for the integrated actuator. The integrated actuator housing 30 is preferably formed of a lightweight, low-cost, high strength material, preferably with sufficient resiliency to avoid cracking in its intended environment. An example material is polybutylene terepthalate having a glass fibre filler, PBT-GF30. The housing 30 is preferably formed by injection molding. The present integrated actuator is not limited to having a main housing 30 of the particular shape shown by the FIG. 2 example. As will be understood, many other shapes and constructions are contemplated in view of varying external requirements such as, for example, particular space requirements of a vehicle door (not shown) into which the described apparatus will be mounted. Alternative shapes and configurations will be readily understood to a person of ordinary skill in the art.

Referring to FIG. 2, the example integrated actuator housing 30 includes a motor mounting surface 32 for securing and supporting an actuator motor such as, for example, the actuator motor 33 depicted at FIG. 3 having a flange 34 shaped, for this example, to cooperate with the FIG. 2 mounting surface 32. Associated with the motor mounting surface 32 is a plurality of holes 36 extending normal to the surface 32 and arranged, for this example, in accordance with the arrangement of the clearance holes 66 formed in the motor flange 34 as shown in FIG. 3.

The FIG. 2 example integrated actuator housing 30 further includes a shaft enclosure structure 38, forming a clearance 40 for receiving a motor driving member such as, for example, the shaft 56 of the FIG. 3 example actuator motor 33. The FIG. 2 example integrated housing 30 also includes a magnetic sensor space or chamber 44 formed by a portion 38b of the shaft enclosure structure 38 and a wall 46, and a control enclosure chamber 48, separated from the magnetic sensor chamber 44 by the wall 46 described below.

With continuing reference to FIG. 2, the control enclosure chamber 48 is constructed and arranged to support and enclose a control module or control circuitry such as, for example, a printed circuit board (PCB) assembly. An example support structure for a control module or control circuitry within the control enclosure chamber 48 is a set of abutments or rails extending along each side 48a such as, for example, the rails 50 visible in the FIG. 7 exploded view of an example assembly using the FIG. 2 housing 30. As will be described in reference to FIG. 7 and elsewhere, the rails 50 guide a PCB such as the example PCB 52.

Figure 7:
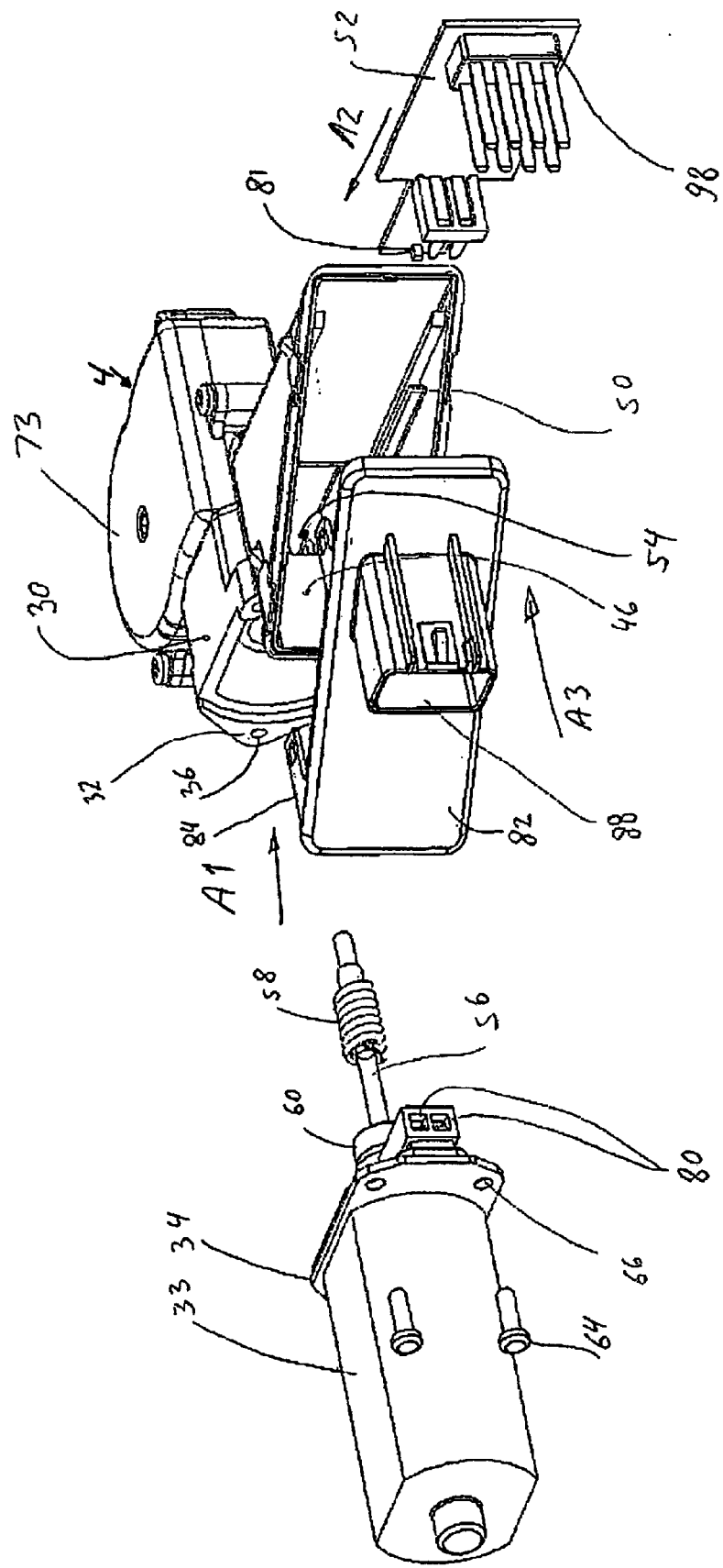
FIG. 7 is an exploded view of the FIG. 6 assembly.

Referring to FIG. 2, and the FIG. 7 exploded view of an example assembly based on the FIG. 2 housing 30, a passage or window 54 may be formed in the wall 46 separating the control enclosure chamber 48 from the magnetic sensor chamber 44. A passage such as the window 54 provides clearance for a sensor, such as item 81 described below, mounted on the PCB 52 or otherwise located in the control enclosure chamber 48 to sense the position of the actuator motor shaft 56, and also provides clearance for an electrical power connection to the actuator motor 33, such as the power prong 78 connecting to the motor receptacle 80 as described below.

As will be understood, an advantage of establishing power connection and sensor connection to the actuator motor through the window 54, instead of using external prongs on the casing of the motor, such as shown in the FIG. 1 prior art example, is that it reduces the number of external connections from, for example, the five connections of FIG. 1.

FIG. 3 shows an example actuator driving motor 33, having a mounting flange 34, motor receptacle 80, a rotatable output shaft 56, and a worm gear 58, either attached to or formed integrally with the shaft 56. A position sensor, which includes the depicted ring magnet 60 may be attached to the shaft 56. As known in the art, a ring magnet such as item 60 generates an alternating magnetic field as it is rotated. Accordingly, for this example, a magnetic sensor such as 81 shown in FIG. 7 is mounted on, for example, the FIG. 7 depicted PCB 52 installed in the control enclosure chamber 48, with its sensor portion (not separately numbered) extending through the above-described window 54 in the separating wall 46 into the magnetic sensor chamber 44.

FIG. 4 shows a portion of the FIG. 2 example integral housing 30 with the FIG. 3 actuator motor 33 connected, for example, by screws 64 holding its flange 34 against the motor mounting surface 32. The screws 64 pass through flange clearance holes 66 (not visible in FIG. 4) and engage with the holes 36 formed in the housing 30. Referring to the example housing 30 of FIG. 2 and the example motor 33 of FIG. 4, respectively, the motor shaft 56 extends into the clearance hole 40 formed by the shaft enclosure structure 38 (visible in FIG. 2, not visible in FIG. 4), and is secured at its distal end (not numbered) by a bushing or other actuator shaft support 68 molded into or installed in the depicted portion of the gearbox 4.

With continuing reference to FIG. 4, the gearbox 4 supports a driven shaft bushing 70 that receives, for example a driven shaft (not shown) having a ring gear (not shown) that engages with the worm gear 58. It is generally preferable that the worm gear 58 be positioned on the shaft 56 to be substantially centered with respect to the driven shaft bushing 70. A peripheral ridge 72 supports a gearbox cover plate, such as plate 73 shown in FIGS. 5, 6 and 7, secured, for example, by screws (not shown in FIG. 4) extending through clearance holes in the gearbox cover plate (also not shown in FIG. 4) and engaging with holes in the housing 4, such as the FIG. 4 holes 74.

Figure 5:
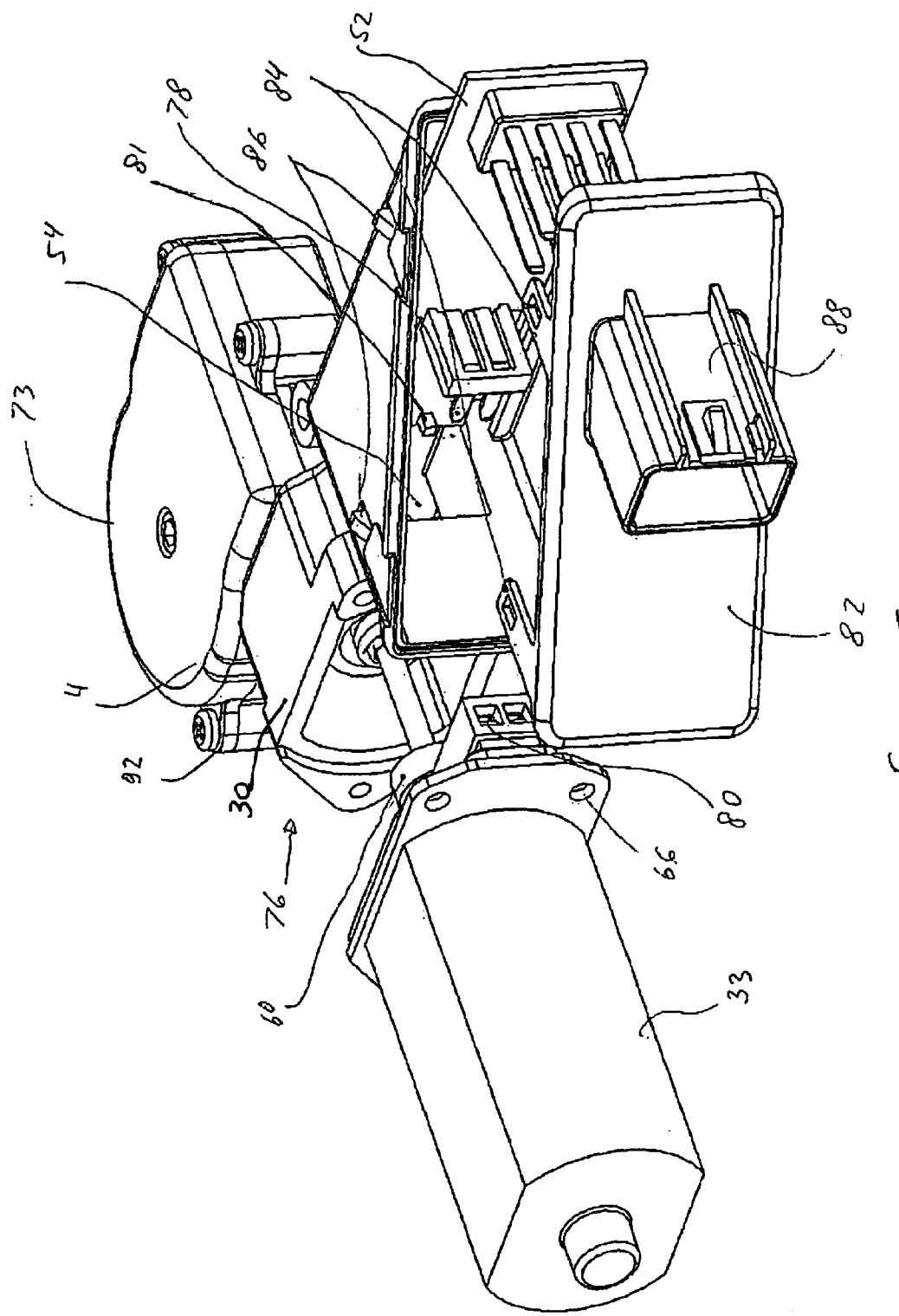
FIG. 5 is a perspective view of the hardware embodiment shown by FIG. 2, partially assembled with the FIG. 3 example driving motor, a printed circuit board, and cover plates.

FIG. 5 shows an example arrangement of an integrated actuator, referenced generally as 76, partially disassembled for purposes of description. A PCB 52 is mounted in the control enclosure chamber 48. The PCB 52 supports, at its end proximal the window 54, a motor power prong 78. The power prong 78 cooperates with the power receptacle 80 on the actuator motor 33. The PCB 52 also supports a position sensor 81 that detects, for example, the alternating magnetic field generated by the ring magnet 60 attached to the motor shaft 56. As will be described in reference to an example assembly sequence, the actuator motor 33 is first secured to the housing 30 by, for example, the screws 64. The PCB 52 is then inserted into the control enclosure chamber 48 by sliding it along the support rails 50 (visible in FIGS. 2 and 7 but not visible in FIG. 5) until the power prong 78 extends through the window 54, engages with the motor receptacle 80, and an inward edge of the PCB 52 abuts against the separating wall 46. The position sensor 81 is located at right angle to the ring magnet 60 such that it detects the alternating magnetic field generated by the ring magnet 60.

Referring to FIG. 5, a cover plate 82 is constructed and shaped in a manner so to cooperate with the peripheral ridge 48p of the control circuitry enclosure chamber 48, and is secured against the periphery 48p by, for example, the flexible lock tabs 84 attached to the plate 82 deflecting and then locking on the cover receiving lock tabs 86 formed on the enclosure chamber 48. An example material is polyamide having a glass fibre filler, PA66-GF30. The cover plate 82 is preferably formed by injection molding.

Further referring to FIG. 5, an example master connection unit 88 extends through a cooperating through-passage (not numbered) formed in the cover plate 82. The master connection unit 88 includes a receptacle with a plurality of prongs for external connection to a vehicle connection. The portion of the master connection unit 88 interior to the circuitry enclosure chamber removable connects to a cooperating receptacle (not shown) mounted on the PCB 52. Preferably, the master connection unit 88 is the only connection from the vehicle to the integrated actuator 76. The master connection unit 88 being an individual component is only an example connection. An alternative structure integrates the external receptacle of the master connection unit 88 into the cover plate 82, with a plurality of pins extending through and supported by the plate 82 by, for example, a support molded within the receptacle.

As seen from FIG. 5, the example integrated actuator 76 further includes a gearbox cover plate 73 that is constructed and arranged so as to cover the area defined by the FIG. 4 peripheral ridge 72. The gearbox cover plate is secured to the housing 30 by, for example, screws passing through clearance holes 92 and engaging with holes formed in the housing 4 proximal to the ridge 72, such as the FIG. 4 holes 74.

Figure 6:
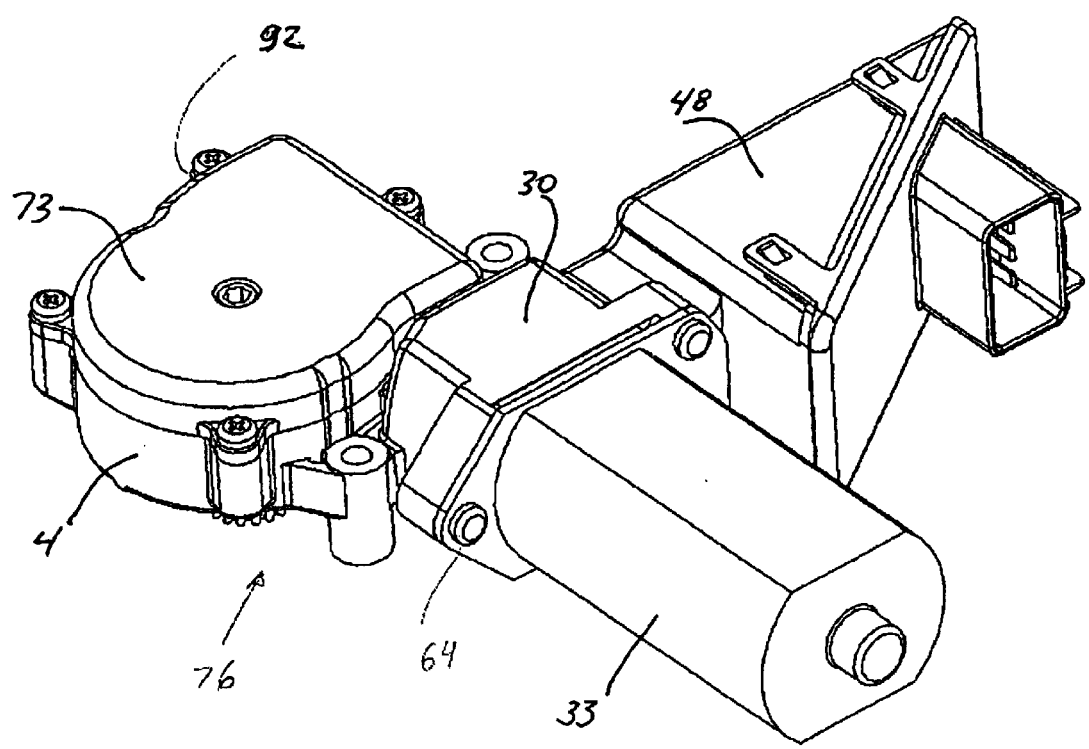
FIG. 6 is a perspective view of a completely assembled FIG. 5 example partial assembly, having a partial cut away showing portions of the FIG. 3 example actuator driving motor and the printed circuit board.

FIG. 6 shows integrated actuator 76 fully assembled. As can be seen, the integrated actuator 76, when assembled, is a unitary hardware piece ready for mounting into, for example, the door or roof section of a vehicle.

FIG. 7 shows an exploded view of the FIG. 6 integrated actuator 76, and will be used as a reference for describing an example sequence of assembly. It will be understood that the example sequence of assembly, as well as the example structures depicted herein, are for the primary purpose of describing, by example, features and aspects of the integrated actuator. The examples are not intended as a limitation on the particular structure or any of its variations and alternative embodiments or applications.

Referring to FIG. 7, an example assembly sequence is as follows: first an integrated frame or housing, such as the FIG. 2 example 30, is temporarily mounted to a jig, fixture or workstand (collectively references as "assembly fixture"). The design assembly fixtures are well-known in the manufacturing arts, and one of ordinary skill in such arts can readily configure an appropriate fixture upon reading this description, in further view of the quantity of units to be built and other well-known design considerations. It is assumed for this description of assembly that the ring magnet 60, or other position sensor member, is preassembled onto the shaft 56, and that the actuator motor 33 has an integrated worm screw 58, or that the worm screw 58 is also preassembled onto the shaft 56. After mounting the actuator housing 30 to the assembly fixture, the motor 33 is oriented such that the distal end of its shaft 56 is aligned with the bore of the clearance hole 40, and then inserted into the housing 30, by an action labeled A1, until its flange 34 mates with the surface 32. Screws 64 are inserted through the clearance holes 66 and threaded into holes 36 of the housing 30. The cooperative engagement between the screws 64 and the holes 36 is accomplished in this instance by the screws 64 being self-threading. Next, the printed circuit board 52 is aligned as shown, such that the power prong 78 is aimed toward the window 54, then inserted into the control enclosure chamber 48, and then slid along the support rails 50, by the action labeled A2, until the power prong 78 extends through the window 54 and engages with the motor receptacle 80 on the motor 33. The inward motion is stopped by the power prong 78 engaging with the receptacle 80, or by the inward edge of the PCB 52 abutting against the separating wall 46. Next, the control chamber cover 82 is snapped into place by the action labeled A3. The control chamber cover then secures the PCB 52 in place. The control chamber cover 82 shown in FIG. 7 is formed with the depicted integral master connection unit 88, having a center clearance. Instead of pins extending through the center of the unit, a vertical conductor support 98, having a plurality of conductors disposed thereon, is mounted to the PCB 52. The vehicle connector (not shown) that inserts into the master connection unit 88 has conductors that cooperate with and make contact with the conductors disposed on the vertical conductor support 98. Prior to, during or subsequent to the above-described assembly sequence, a ring gear (not shown) with an axle (not shown) is inserted such that its axle passes through the support bushing 70, shown in FIG. 4, and the ring gear's teeth mesh with the worm gear 58. The cover 73 is then installed over the ridge 72 shown in FIG. 4.

Those skilled in the arts pertaining to actuators will readily understand that the preferred embodiments described above may be modified, without departing from the true scope and spirit of the description and claims, and that the particular embodiments shown in the drawings and described within this specification are for purposes of example and should not be construed to limit the claims below.

I claim:
1. An integral actuator, comprising:
a frame having a first at least partially closed chamber a second at least partially enclosed chamber, and a passage connecting said first chamber with said second chamber;
an actuator motor with a power output shaft, secured to said frame such that said power output shaft extends into said first chamber;
a control circuit mounted in said second chamber, said control circuit having circuitry to transfer an externally supplied electrical power from within said second chamber to within said first chamber, said control circuit having circuitry to receive a sensor signal transferred from within said first chamber to within said second chamber; and
a power translation member connected to said output shaft.

2. An integral actuator according to claim 1, further comprising a cover secured to said frame such that said second chamber is substantially fully enclosed.

3. An integral actuator according to claim 2, further including a plurality of conductors extending through said cover, arranged such that when said cover is secured to said frame at least one of said plurality of conductors makes electrical contact with said control circuit.

4. An integral actuator according to claim 3 wherein said cover is removably secured.

5. An integral actuator according to claim 2 wherein said cover is removably secured.

6. An integral actuator according to claim 5 wherein a structure of said frame associated with said second chamber includes at least one flexible clip receptacle, said cover includes at least one flexible clip, and wherein said cover is secured to said frame to form said substantially enclosed second chamber by said at least one flexible clip engaging with said at least one flexible clip receptacle.

7. An integral actuator according to claim 2, wherein said second chamber includes a support structure, and further comprises a control circuit supported by said support structure, wherein said control circuit is secured by a surface of said second chamber and by said cover.

8. An integral actuator according to claim 2, wherein said cover includes a receptacle support for receiving an external connector, and a plurality of pins extending through said cover in alignment with said receptacle support, and wherein said control circuit includes electrical contacts, constructed and arranged such that when said cover is secured to said frame said pins contact said electrical contacts.

9. An integral actuator according to claim 8, wherein said second chamber includes a support structure, and further comprises a control circuit supported by said support structure, wherein said control circuit is secured by a surface of said second chamber and by said cover.

10. An integral actuator according to claim 2, wherein said cover includes a receptacle support for receiving an external connector, and a terminal clearance hole extending through said cover in alignment with said receptacle support, and wherein said control circuit includes electrical conducting members extending in direction such that when said cover is secured to said frame said electrical conducting members extend through said terminal clearance hole.

11. An integral actuator according to claim 10, wherein said second chamber includes a support structure, and further comprises a control circuit supported by said support structure, wherein said control circuit is secured by a surface of said second chamber and by said cover.

12. An integral actuator according to claim 2, wherein said cover includes a connector through hole, and further comprising a connects extending through said through hole, said connector including a receptacle support for receiving an external connector, and a plurality of pins extending, each having an external connection terminal above a surface of said cover and an internal connection below said surface, said wherein said control circuit includes electrical contacts, constructed and arranged such that when said cover is secured to said frame said internal connection points contact respective ones of said electrical contacts electrical.

13. An integral actuator according to claim 12, wherein said second chamber includes a support structure, and further comprises a control circuit supported by said support structure, wherein said control circuit is secured by a surface of said second chamber and by said cover.

14. An integral actuator according to claim 1, wherein the control circuit is contained on a printed circuit board that is mounted substantially perpendicular to the output shaft of the actuator motor.

15. An integral actuator according to claim 1 further comprising:

a pair of rails formed on the frame within the second chamber; and wherein the control circuit is contained on a printed circuit board that is received by the pair of rails such that the printed circuit board is mounted substantially perpendicular to the output shaft of the actuator motor.

16. An integral actuator according to claim 1 further comprising:

a printed circuit board on which is contained the control circuit;

a sensor mounted on the printed circuit board;

a power connector mounted to the printed circuit board; and wherein the printed circuit board is mounted within the second chamber such that the printed circuit board at least partially passes through the passage and into the first chamber and such that the sensor and the power connector are disposed within the first chamber.

17. An integral actuator according to claim 16, wherein the sensor is a position sensor that detects the alternating magnetic field generated by a ring magnet attached to the output shaft.

* * * * *